United States Patent [19]
Takahashi et al.

[11] Patent Number: 5,816,107
[45] Date of Patent: Oct. 6, 1998

[54] JOINT FOR INDUSTRIAL ROBOT

[75] Inventors: Shingi Takahashi; Seiji Matsumoto, both of Yokohama, Japan

[73] Assignee: Tokico Ltd., Kanagawa-ken, Japan

[21] Appl. No.: 746,924

[22] Filed: Nov. 18, 1996

[30]   Foreign Application Priority Data

Nov. 20, 1995  [JP]  Japan .................................. 7-301734

[51] Int. Cl.⁶ ............................... B25J 9/12; B25J 19/00
[52] U.S. Cl. ...................... 74/490.02; 414/918; 901/23; 901/50
[58] Field of Search .................... 74/490.02, 490.03, 74/526; 901/23, 25, 28, 50; 414/918, 729; 248/51, 52

[56]         References Cited

U.S. PATENT DOCUMENTS

| | | | |
|---|---|---|---|
| 3,896,681 | 7/1975 | Boyle ........................................ | 74/526 |
| 4,864,888 | 9/1989 | Iwata ..................................... | 901/23 X |
| 4,906,121 | 3/1990 | Torii et al. ............................. | 901/28 X |

FOREIGN PATENT DOCUMENTS

| | | | |
|---|---|---|---|
| 3-166091 | 7/1991 | Japan ................................... | 414/918 |
| 88/05368 | 7/1988 | WIPO ................................... | 414/918 |

*Primary Examiner*—Charles A. Marmor
*Assistant Examiner*—Troy Grabow
*Attorney, Agent, or Firm*—Pearne, Gordon, McCoy & Granger LLP

[57]        ABSTRACT

A swinging base 12 is provided on top of a stationary base 11 such as to be capable of rotating by means of a bearing 13. A reduction gear 15 is provided in a depression portion 14 formed on the top surface of the stationary base 11. A motor 16 having a rotational shaft 17 connected to the reduction gear is provided on the swinging base. A cable support portion 21 which is rotatably supported by means of a bearing 18 provided on an axis A is provided inside the stationary base 11. The cable support portion 21 supports cables C. A through hole 23 is formed in the bottom of the swinging base 12. An arcuate aperture portion 24 is formed in the stationary base 11. The cables C are passed through the aperture portion 24 and the through hole 23. With this invention, cables which are installed in industrial robots can be supported without receiving excessive forces.

11 Claims, 3 Drawing Sheets

JOINT FOR INDUSTRIAL ROBOT

BACKGROUND OF THE INVENTION

1. Technical Field of the Invention

The present invention relates to industrial robots having arm portions provided on base portions.

2. Background Art

Conventionally, most of industrial robots are the multi-jointed type as shown in FIG. 5.

This robot R has a stationary base which is anchored to the floor. A swinging base 2 which is capable of turning about the axis A is supported on top of this stationary base 1. A first arm 3 which is capable of turning about the axis B is coupled to this swinging base 2. A second arm 4 which is capable of turning about the axis C is coupled to this first arm 3. A wrist 5 which is capable of rotating about the axis D is provided on the tip of this second arm 4. This wrist 5 has three degrees of freedom and is capable of rotating about the axes E, F and G which also include the axis D. Various types of work devices, such as spray guns, can be attached to the tip of this wrist 5 in order to perform work.

An example of this type of robot is described in Japanese Patent Application, First Publication No. 2-160485. This robot has an arcuate elongated hole formed on the top surface of the stationary base. Cables are passed through this elongated hole so as to extend from the swinging base and are connected to various devices or motors for driving the joints. These cables are lain along the bearing bottom of the stationary base.

However, in robots with the above-described structure having extensive cables which are pulled in various directions, the cables are not supported at the center of rotation, so that the cables can receive excessive flexural forces. If the cables are given a lot of slack in order to avoid such flexural forces, then hollow portions inside the stationary base for storing the cables become large, thereby increasing the size of the base.

Additionally, since the cables are not supported at the center of rotation and there are no protective structures for the cables, there is the risk of the cables becoming scratched by contacting the bottom of the stationary base, or contacting the edges of the elongated hole.

SUMMARY OF THE INVENTION

An industrial robot, comprising a stationary base which is anchored to an installation surface; a swinging base which is rotatably supported on top of the stationary base; and an arm portion provided on the swinging base; wherein the stationary base comprises an aperture portion for passing cables which pass through the interiors of the stationary base and the swinging base, and move in a circumferential direction about the rotational axis of the swinging base by trailing the rotation of the swinging base; and a cable support portion for supporting the cables extending from the aperture portion to the inside of the stationary base along the rotational axis of the swinging base.

As a result, when the swinging base is rotated and the cables move within the aperture portion to follow this rotation, the ability of the cables to track the rotation of the swinging base can be improved because the cable support portion supporting the cables is held on the rotational axis, thereby largely reducing the application of flexural forces on the cables.

PREFERRED EMBODIMENTS OF THE INVENTION

Hereinbelow, an embodiment of an industrial robot according to the present invention will be explained with reference to the drawings.

Figure 1:
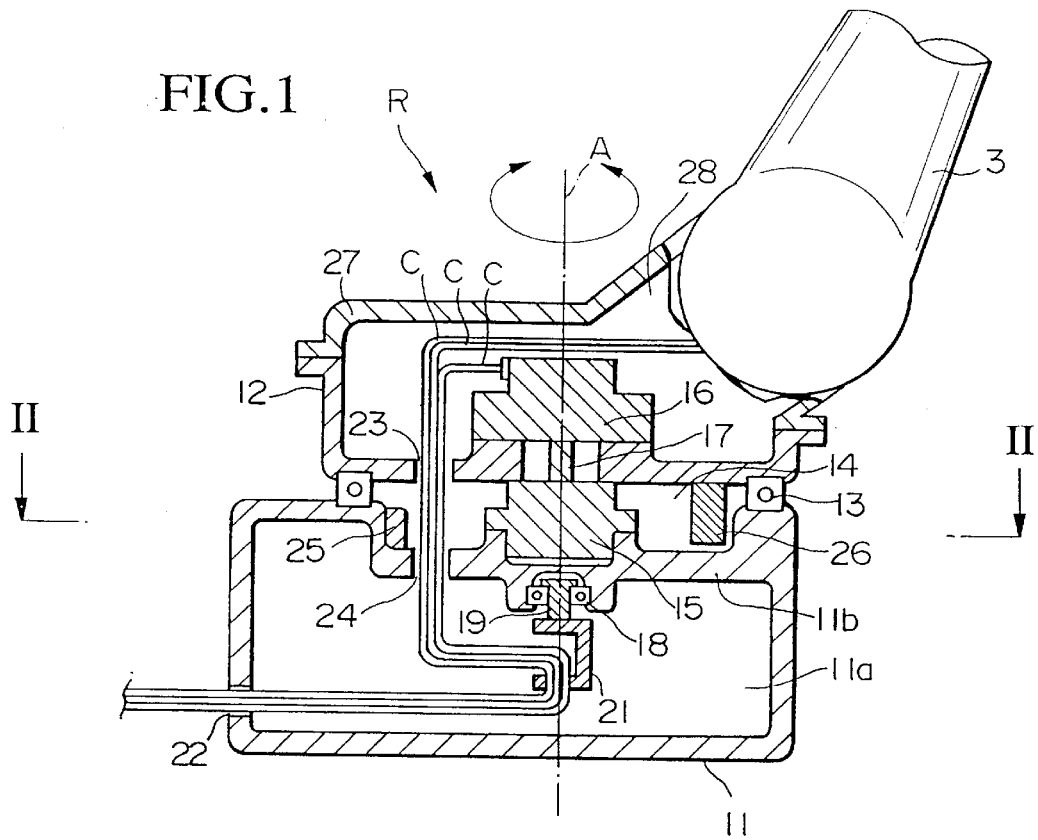
FIG. 1 is a section view showing a base portion of an industrial robot for explaining the composition and structure of an industrial robot according an embodiment of the present invention.
Figure 2:
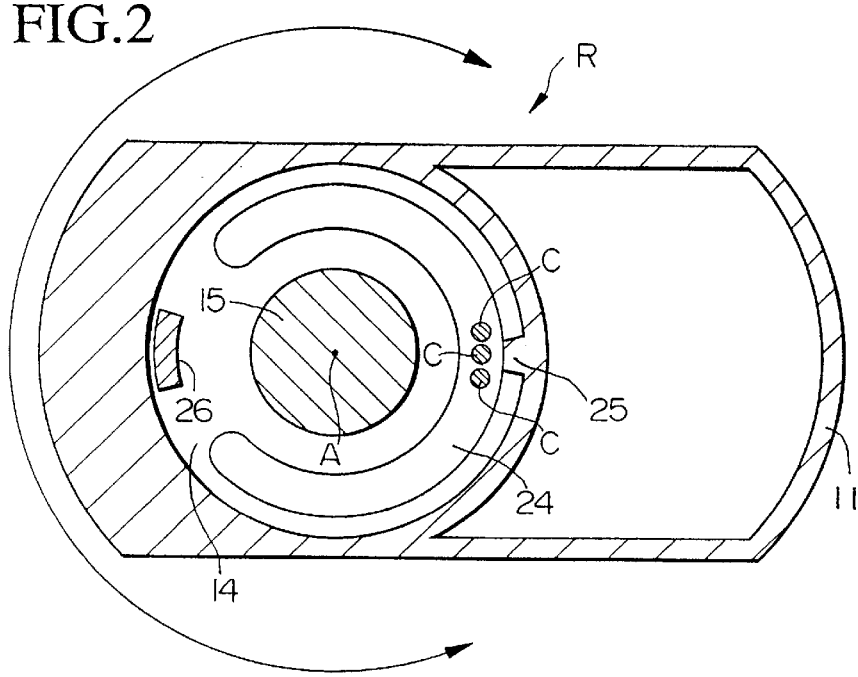
FIG. 2 is a section view cut along the line II—II of FIG. 1 showing a base portion of an industrial robot for explaining the composition and structure of an industrial robot according to an embodiment of the present invention.

In FIGS. 1 and 2, reference numeral 11 denotes a stationary base. The top portion of this stationary base 11 is coupled to a swinging base 12 by means of a bearing 13. The swinging base 12 is capable of turning about the axis A with respect to the stationary base 11 due to the bearing 13.

On the top surface of the stationary base 11, depression portions 14 are formed at positions underneath the swinging base 12. A reduction gear 15 is provided at the center of the stationary base 11 inside this depression portion 14. The rotational shaft 17 of a motor 16 provided in this swinging base 12 is connected to this reduction gear 15. The rotational shaft. 17 is rotated by being driven by the motor 16. The rotational force of the rotational shaft 17 is transmitted to the reduction gear 15. That is, when a rotational force is transmitted from the rotational shaft 17 of the motor 16 to the reduction gear 15, the rotational force of this rotational shaft 17 is transmitted to the stationary base 11 by the reduction gear 15. As a result, the swinging base 12 is able to rotate about the axis A with respect to the stationary base 11.

Additionally, inside the space 11a formed within the stationary base 11, a bearing 18 is provided on the axis A at the bottom of the top surface portion 11b of the stationary base 11. This bearing 18 rotatably supports a rotational shaft 19. A cable support portion 21 is affixed to this rotational shaft 19. This cable support portion 21 supports various cables which extend from a hole portion 22 formed in the side portion of the stationary base 11. That is, the points of support of the cables C inside the stationary base 11 are capable of rotating about the axis A.

The swinging base 12 has a through hole 23 formed in the bottom portion thereof. The cables C are passed through this through hole 23. On the stationary base 11, an arcuate aperture portion 24 is formed at the top surface portion 1ib inside the depression portion 14. The cables C which extend from the through hole 23 are passed through this aperture portion 24.

Additionally, a stopper (rotation restriction element) 25 is formed on the circumferential wall of the depression portion 14 formed on the top surface portion 11b of the stationary base 11. A protrusion (rotation restriction element) 26 which protrudes in the direction of the stationary base 11 is formed on the bottom surface side of the swinging base 12. Due to the stopper 25 of the stationary base 11 contacting the protrusion portion 26 of the swinging base 12, the range of rotation of the swinging base 12 with respect to the stationary base 11 is restricted to a range shorter than the length of the aperture portion 24 in the circumferential direction.

A cover 27 is attached to the top surface side of the swinging base 12. This cover 27 protects the motor provided inside the space portion 28 on the top surface side of the swinging base 12.

According to the industrial robot constructed in the above manner, the cable support portion 21 supporting the cables C inside the stationary base 11 provides support while allowing rotation about the axis A of the swinging base 12, so that when the swinging base 12 turns, the cable support portion 21 turns along with the movement of the cables C due to the turning of the swinging base 12. As a result, the flexural forces applied on the cables C can be considerably reduced.

Additionally, since the stopper 25 provided on the stationary base 11 and the protrusion portion 26 provided on the swinging base 12 restrict the range of rotation of the swinging base 12 to be shorter than the length of the aperture portion 24 in the circumferential direction, the cables C can be prevented from contacting the edges of the aperture portion 24 due to the rotation of the swinging base 12.

Figure 3:
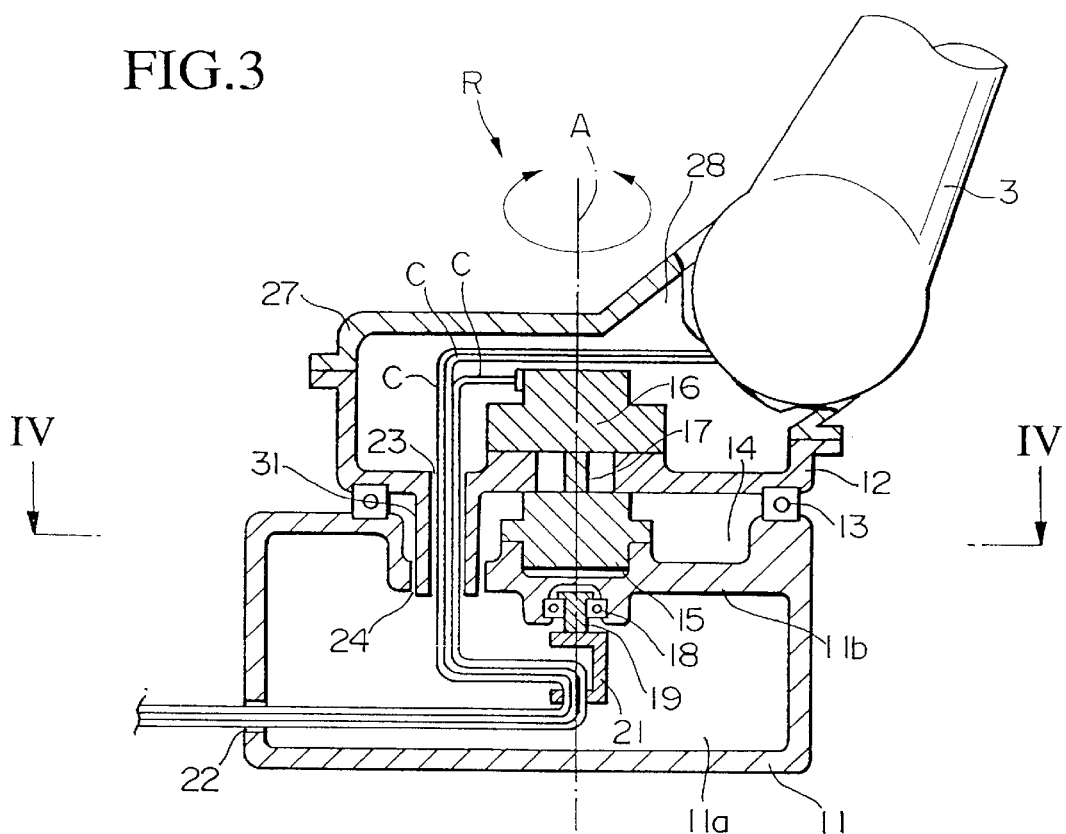
FIG. 3 is a section view showing a base portion of an industrial robot for explaining the composition and structure of an industrial robot according to another embodiment of the present invention.
Figure 4:
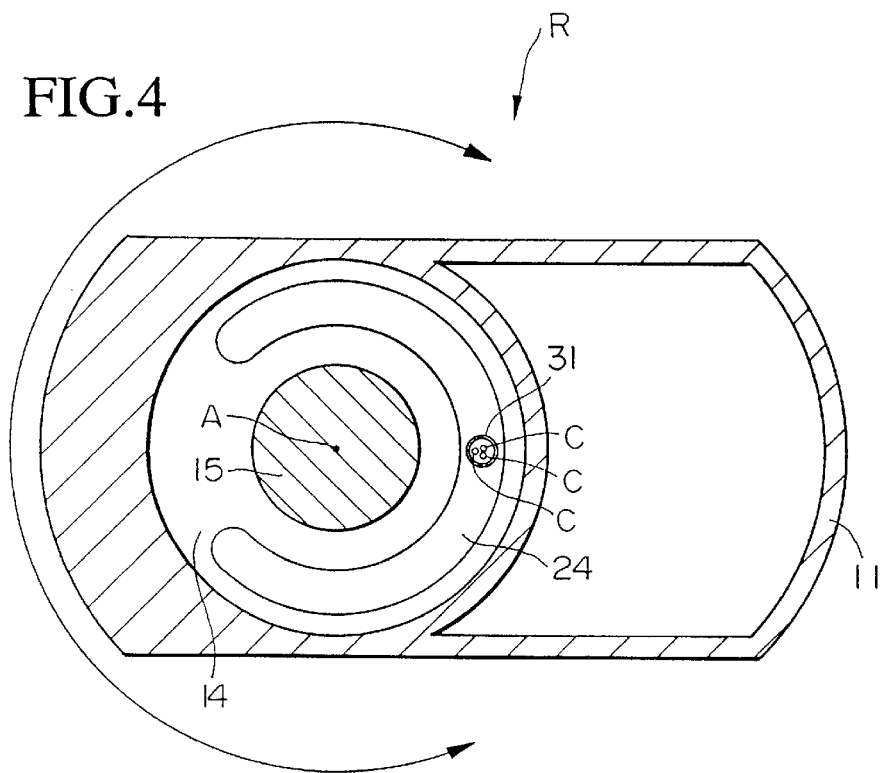
FIG. 4 is a section view cut along the line IV—IV of FIG. 3 showing a base portion of an industrial robot for explaining the composition and structure of an industrial robot according to an embodiment of the present invention.
Figure 5:
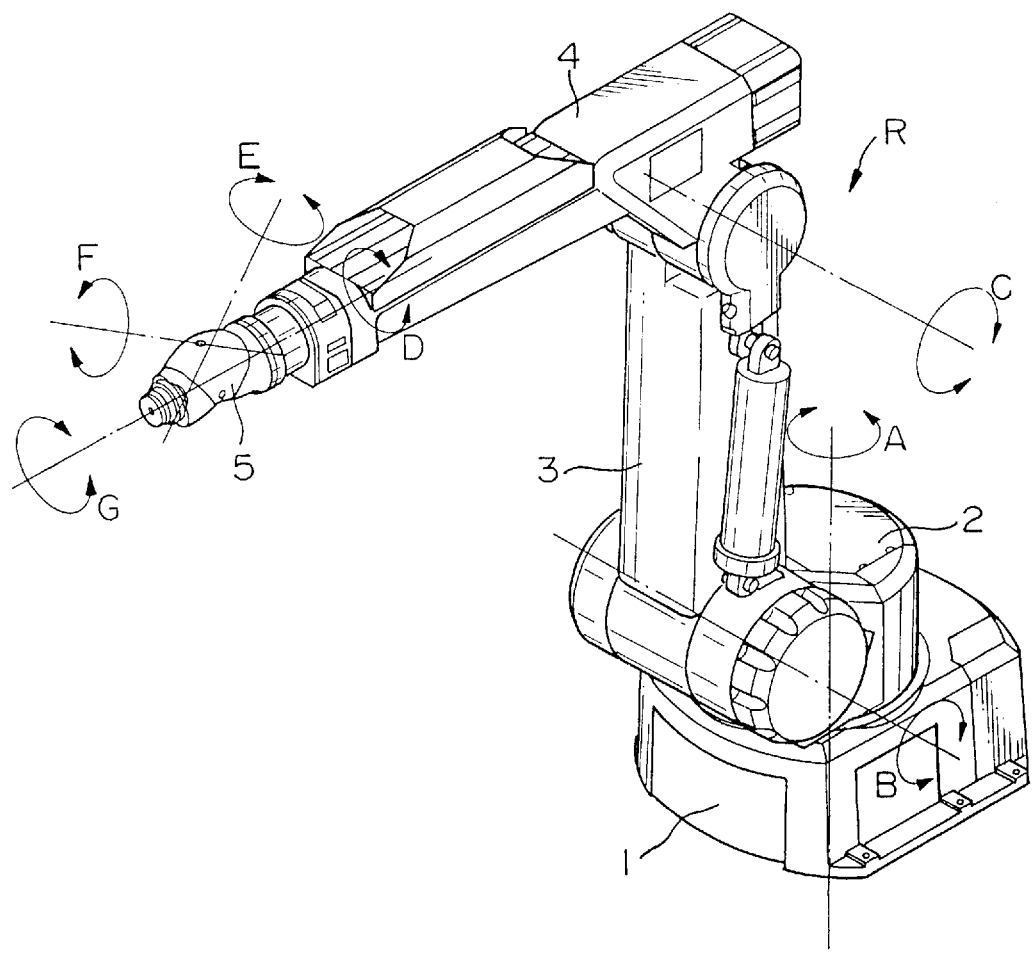
FIG. 5 is a perspective view showing a conventional industrial robot for explaining the overall composition and structure of a conventional industrial robot.

FIGS. 3 and 4 show an embodiment wherein a tubular portion 31 communicating with the through hole 23 protrudes downward from the swinging base 12. This tubular portion 31 communicates with the aperture portion 24 of the stationary base 11. With an industrial robot of this structure, the cables C are passed through a tubular portion 31 at the boundary between the stationary base 11 and the swinging base 12, so that the cables C can be prevented from contacting the edges of the aperture portion 24 of the stationary base 11 when the swinging base 12 rotates.

In this case, the tubular portion 31 forms a rotation restriction element for restricting rotation by contacting the end portion of the aperture portion 24. For this reason, the stopper 25 of the stationary base 11 and the protrusion portion of the swinging base 12 are not necessary.

We claim:

1. An industrial robot, comprising:

a stationary base which is anchored to an installation surface;

a swinging base which is disposed on top of said stationary base;

an arm portion provided on said swinging base;

a bearing which is provided between said stationary base and said swinging base, and which rotatably supports said swinging base with respect to said stationary base; and cables which pass through said stationary base and said swinging base, and which move in a circumferential, direction about a rotational axis of said swinging base when said swinging base rotates; and wherein said stationary base comprises:

an aperture portion through which said cables extend so as to be disposed outward from the rotational axis of the swinging base and inward from the bearing; and a cable support portion for supporting said cables inside of said stationary base along the rotational axis of said swinging base.

2. An industrial robot in accordance with claim 1, wherein said aperture portion is formed in an arcuate shape along the rotational path taken by said cables when said swinging base is rotated.

3. An industrial robot in accordance with claim 1, wherein said cable support portion is capable of rotating about the rotational axis of said swinging base.

4. An industrial robot in accordance with claim 2, further comprising rotation restriction elements for restricting a range of rotation of said swinging base to less than a circumferential length of said arcuate aperture portion, said rotation restriction elements being disposed between said stationary base and said swinging base.

5. An industrial robot in accordance with claim 4, wherein said rotation restriction elements are protrusions respectively provided on said stationary base and said swinging base, for restricting the range of rotation of said swinging base by coming into mutual contact.

6. An industrial robot in accordance with claim 2, wherein said swinging base is provided with a through hole which communicates with said aperture portion of said swinging base, and said cables are passed through said through hole.

7. An industrial robot in accordance with claim 6, wherein said through hole formed in said swinging base is provided with a tubular portion which protrudes toward the stationary base and passes through said aperture portion of said stationary base.

8. An industrial robot in accordance with claim 7, wherein said tubular portion provided on said swinging base restricts the range of rotation of said swinging base to less than the circumferential length of said aperture portion by coming into contact with end portions of said aperture portion.

9. An industrial robot in accordance with claim 1, further comprising: a motor provided on a top surface side of said swinging base; and wherein said swinging base is rotated by means of the rotational force of the motor being transmitted to said stationary base.

10. An industrial robot in accordance with claim 1, wherein a hole portion is formed on a side portion of said stationary base, and said cables are extended from the hole portion to be supported by said cable support portion.

11. An industrial robot in accordance with claim 1, further comprising: a spray gun attached to said arm portion.

* * * * *